United States Patent [19]

Wu

[11] Patent Number: 4,660,394
[45] Date of Patent: Apr. 28, 1987

[54] PUSH-BUTTON TYPE STEERING WHEEL LOCK

[76] Inventor: Jan Y. Wu, 572, Hai Tien Road, Sec. 2, Tainan City, Taiwan

[21] Appl. No.: 704,486

[22] Filed: Feb. 22, 1985

[51] Int. Cl.$^4$ .................. B60R 25/00; E05B 37/22; E05B 65/12
[52] U.S. Cl. .................................... 70/25; 70/53; 70/238; 70/298; 70/322
[58] Field of Search .............. 70/237, 238, 254, 22, 70/24, 25, 53, 214, 220, 320–322, 297, 298

[56] References Cited

U.S. PATENT DOCUMENTS

| 603,711 | 5/1898 | Snyder | 70/25 |
|---|---|---|---|
| 1,247,150 | 11/1917 | Rial et al. | 70/237 |
| 2,008,565 | 7/1935 | Segal | 70/25 |
| 2,628,490 | 2/1953 | Klein | 70/25 |

FOREIGN PATENT DOCUMENTS

| 45323 | 2/1932 | Denmark | 70/24 |
|---|---|---|---|
| 2710444 | 9/1978 | Fed. Rep. of Germany | 70/238 |
| 668730 | 11/1929 | France | 70/25 |
| 428176 | 12/1947 | Italy | 70/25 |
| 1107012 | 3/1968 | United Kingdom | 70/238 |
| 1554593 | 10/1979 | United Kingdom | 70/238 |

Primary Examiner—Robert L. Wolfe
Assistant Examiner—Lloyd A. Gall
Attorney, Agent, or Firm—Browdy and Neimark

[57] ABSTRACT

Push-button type steering wheel lock, incorporating two columns of a number of push keys, facing each other, and each provided with an identification code, and mounted on the keyway provided centrally in a vertically installed slider and in a counterpart groove respectively, the slider flanked by aligned projections on both sides to achieve transmission of the slider through engagement with correspondingly shaped cavities provided on a base plate. An L-shaped detent attached on one side of the slider is employed to engage with the bullet-like detent at the annular groove, which is biased by a spring attached at the end thereof to move to and fro, thereby achieving locking and unlocking of the object. In locking, the arcuated portion falls into one arcuated notch of the J-shaped locking stem which is extendably received in a J-shaped tube with the L-shaped detent engaging with the annular groove, and in unlocking, the L-shaped detent disengages from the annular groove, permitting the bullet-like detent to retract and the J-shaped locking stem to freely move against it. Each push key is provided with 10 or an appropriate quantity of cards each bearing a particular code cipher permitting permutation and combination altogether at the sole discretion of the user to constitute a code number that will deny illegal attempts whatever meant to defeat such a lock.

4 Claims, 7 Drawing Figures

PUSH-BUTTON TYPE STEERING WHEEL LOCK

FIELD OF THE INVENTION

This invention relates to an improvement of a push-button type steering wheel lock, comprising essentially two columns of identification push-keys lying side by side and mounted in keyway and counterpart grooves of a slider respectively, the slider flanked by aligned projections on both sides to achieve transmission of the slider through reengagement with correspondingly shaped cavities provided on a base plate. An L-shaped detent attached on one side of the slider is employed to engage with the bullet-like detent at the annular groove, which is biased by a spring attached at the end thereof to move to and fro, thereby achieving locking and unlocking of the object. In locking, the arcuated portion falls into one arcuated notch of the J-shaped locking stem which is extendably received in a J-shaped tube with the L-shaped detent engaging with the annular groove, and in unlocking, the L-shaped detent disengages from the annular groove, permitting the bullet-like detent to retract and the J-shaped locking stem to freely move against it. Each push-key is provided with ten or an appropriate quantity of cards, each bearing a specific cipher permitting permutation and combination altogether at the sole discretion of the user to make a code number that will deny and render impossible any illegal attempts directed to defeat and open such a lock.

BACKGROUND OF THE INVENTION

It has been found, regrettably, that the lock used to lock the steering wheel by the owner of an automobile is mostly of the conventional, regular type, which can be easily defeated by a thief skilled in the art, and as such can hardly fulfill the object of a lock.

Another instance not infrequently found with the use of such a regular lock, but absurd enough, is that should the key to the lock, supposedly carried in person by the owner, get lost somewhere and it should happen that the owner must use the car without delay, then the owner has to send for a special locksmith to solve the problem, causing a nuisance and loss of time and money. That is why proposals have been made to provide a coded lock which, although safer than the old-fashioned conventional locks, yet because of the structure involving direct correlation of the locking ends with the locking stem, can hardly prevent attempts to defeat it by an ingenious thief. So there has been a need for quite a long period as regards the provision of a lock that can solve such problems once and for all.

It is in view of the many shortcomings found with the use of conventional and existing locks on the steering wheel of an automobile, such as those defined in the foregoing, that the inventor undertook to work for, and finally with success, to conceive the present invention referred to as a push-button type steering wheel lock hereunder.

SUMMARY OF THE INVENTION

Therefore, a primary object of the present invention is to provide a push-button type lock especially for use on the steering wheel of a car, which works by depression against coded push-buttons in front instead of a matching key and as such eliminates the nuisance of having to keep at hand a mechanical key and of relying upon acoustic ingeniousness when it becomes necessary to set a lock to open it as is the case with locks structured according to previous arts.

A further object of the present invention is to provide a push-button type steering wheel lock comprising essentially two individually shaped mounting plates which permit use of permutations and combinations to make a code chosen solely by the owner, and the code as such, when identified by depression of the keys, will result in the two locking stems turning apart. The lock is thus unlocked, both stems together with the body forming a closed loop when engaged with respect to a catching detent. In that status there is realized a secured locking of the steering wheel in defiance of all unlawful attempts to defeat the lock, which lock proves safer than any otherwise structured lock known in the industry to date.

A further object of the present invention lies in the provision of two keyway grooves on the backside of the coded plate therein, one such groove being set elastically such that the spring from which such elasticity is derived can be driven to the other groove by virtue of a displacement of the plate when a depression is imposed against a corresponding key on the surface, such that the coded plate can remain firmly in position and as such achieve stability for the whole locking mechanism at large so that the slider will not react to slide in the event of unwanted shocking effects.

A further object of the present invention lies in the provision of flanges down on the coded plate where the slider sits in the keyway, serving as an uppermost check point for the coded plate in its upward displacement so that the coded plate will not have a chance to be beyond the locking groove, nor to derail from the push-key pad owing to upwardly imposed stress beyond restriction, which would invalidate the lock.

A further object of the present invention lies in the fact that as long as the lock remains in a closed condition the slider, checked by the coded plate, would not be in a position to exert displacing effects on the projection in front but rests level with the locking lid and the two bits on the tail end attached to the shell casing. In the meanwhile, a thief would find that it is in vain to ever try to defeat the lock by pulling the united locking stem apart or by use of acoustic ingeniousness while working on the coded plate.

A further object of the present invention lies in the provision of a J shaped locking stem engaged into a counterpart J shaped locking tube, both permitting prolongation or contraction to a suitable length as deemed appropriate in respect to the specificity of the automobile to be locked with respect to the steering wheel, so as to better ensure the effects of security against thefts.

BRIEF DESCRIPTION OF THE DRAWINGS

Other features and advantages of the present invention will emerge from the following descriptions of embodiments given by way of illustration but not in any way limiting, with reference to the accompanying drawings in which.

DETAILED DESCRIPTION OF THE PREFERRED EMBODIMENTS

Figure 1:
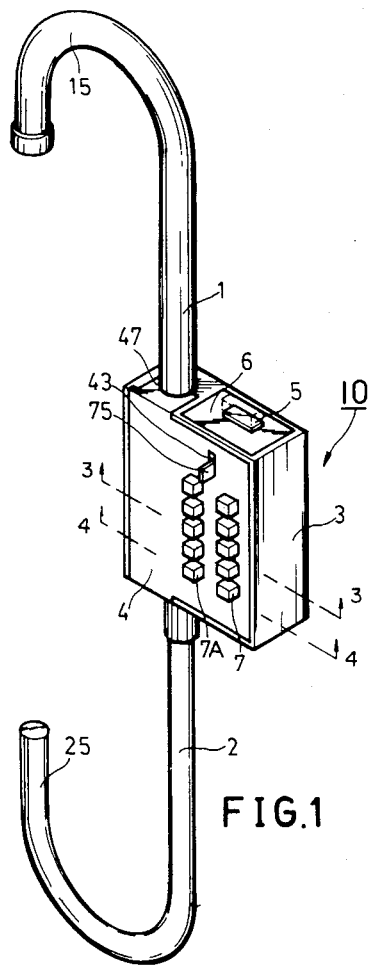
FIG. 1 is an overall perspective of the lock of the present invention structured in a preferred embodiment.
Figure 2:
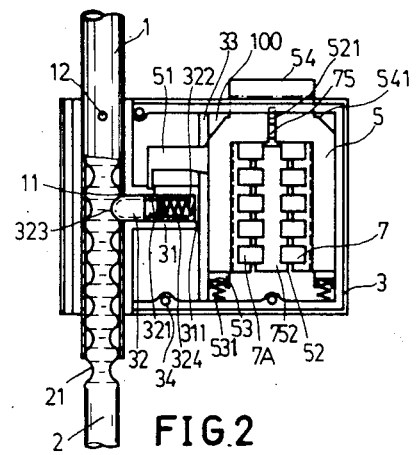
FIG. 2 illustrates the interrelationship of parts constituting the invention with the casing removed.

By referring to FIG. 1 and FIG. 2 it will be apparent that the lock of the present invention consists essentially of two interactive locking stems each shaped like the letter J and one being a tubing 1, the other being of a smaller diameter 2 to facilitate intromission into tubing 1, locking case 3, lock panel 4, slider 5, seal 6 and two individual profiled coded pushkeys 7, 7A. The J shape locking stem 2 has a concrete interior and is formed to have a plurality of arcuated notches 21 on that portion in association with the locking mechanism and is meant for engagement with the counterpart J shape locking tube 1. On the hollow-set locking tube 1, there is provided a drilled hole 11, as would be better seen in FIG. 2, thereby permitting the bullet-like detent 32 to go therethrough and engage with one arcuated notch 21. J-shaped locking tube 1 is also provided with a hole 12 to accommodate to the setting of a fixing pin 371 extended from the locking case 3. The arcuated tipfront 323 of the detent 32 penetrates through said drilled hole 11 and gets caught in arcuated notches 21 relative to the J shape locking stem 2, so as to permit optional adjustment of the locking stem 2, by prolongation or contraction, by setting the detent 32 free of compression underneath an L shape detent 51 extended from the slider member by way of annular groove 321. The detent 32, once pressed upon, will recede and no longer produce a checking effect, as would appear apparent by a study of FIG. 2, and will wind up resting in an arcuated notch 21 provided in the locking stem 2, whereupon the locking stem 2 is decidedly fixed upon and remains in place, thereby achieving the locking objective. Fixing in relation to the accelerator of the subject automobile is made through hook-up locking of the elbow 15 a bend on the locking stem 1, concurrent with the stem edge 25 on the other end on stem 2 secured to the steering wheel. The lock of the present invention depends largely on the active status of the locking stem 2, directed to the steering wheel, for locking and unlocking purposes.

Figure 5:
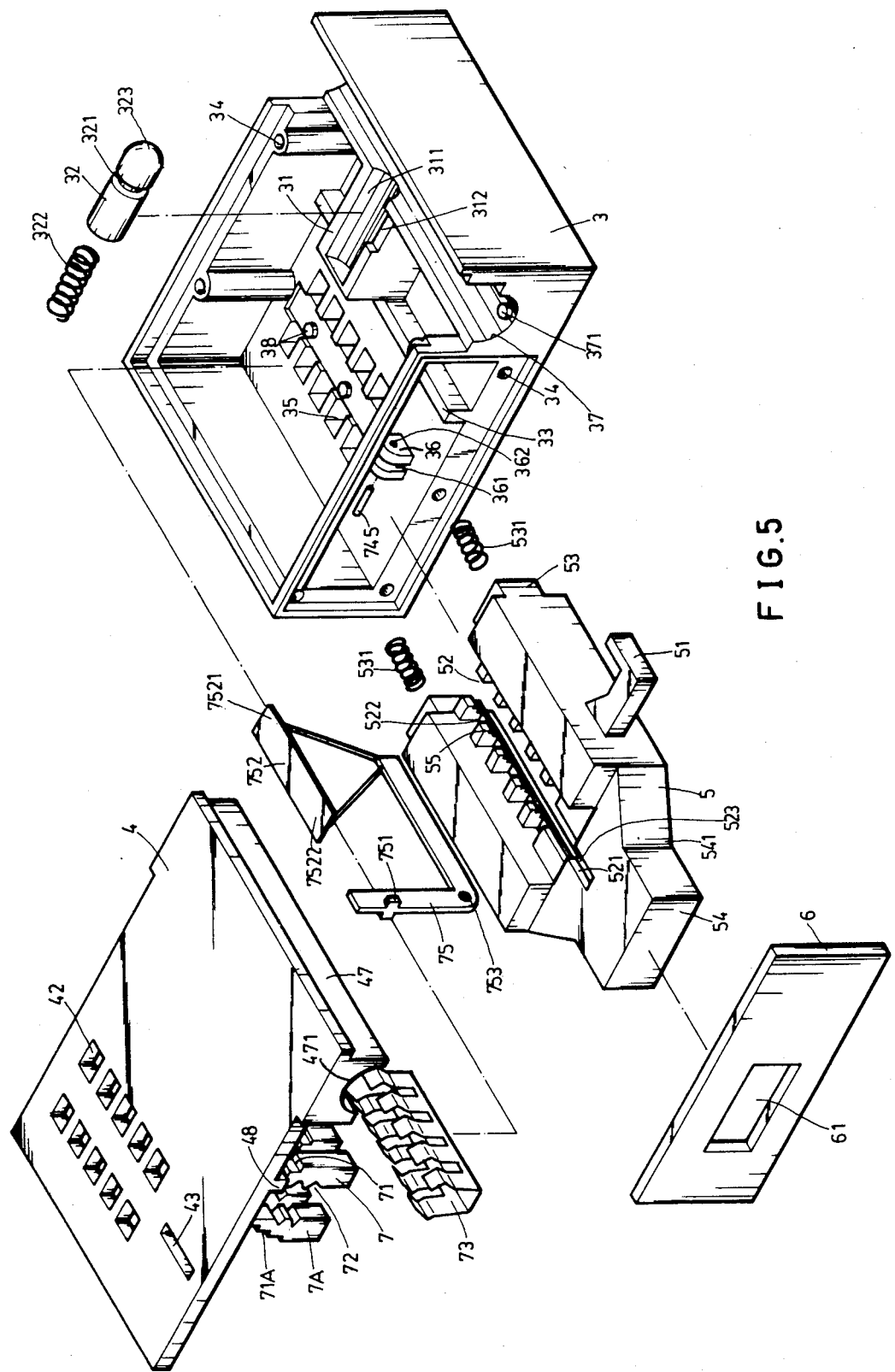
FIG. 5 is an exploded perspective of the main parts constituting in combination the lock of the present invention.

Referring more specifically to FIG. 2, through FIG. 5 it will be seen that the lock body 10 is substantially an embodiment of locking case 3 with lock panel 4, incorporating essentially such elements as slider 5, coded pushkey 7, 7A, spring 73, detent 32, compression springs 322, 531, and reset lever 75. The slider 5 is safeguarded from slippage offside by the provision of seal 6 mounted thereonto.

Figure 3:
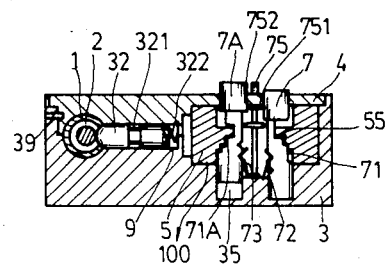
FIG. 3 is a sectioned view of that portion of the lock embodied according to and taken along segment 3—3 as seen in FIG. 1.
Figure 7:
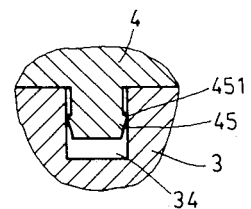
FIG. 7 is a partial cross-sectioned view of the shell casing associated with the locking lid or sealing cover through an extension of the cotter pin therefor, structured hereunder.

The end of the locking case 3 is penetrated by the provision of a semi-circular channel 37 on the bottom. This channel 37, together with another semi-circular channel 471 provided in a rectangular projection 47 provided atop the locking panel 4, forms a throughgoing channel passage to accommodate the intromission of the J shape locking stem 1, as would be better understood by referring more particularly to FIG. 3 through FIG. 5. On the lock casing 3 are provided two extended fixing pins 371 and also on the locking panel 4, permitting insertion into hole 12 in the locking stem 1, but they will not go past the lock armor to affect normal push-in or pull-out operation of the locking stem 2. Engagement of both stems 1 and 2 is executed by having the extended cotter pin 45 emerging on the locking panel 4 forcibly inserted into the hole 34 reserved on the locking case 3. On the width sides of the locking panel 4 are drilled two holes, each to let in an insertion pin 39 to further strengthen the construction of the present invention lock, as is better seen in FIG. 3 through FIG. 4. On the projection pin 45 are provided annular bosses 451 very minimally dimensioned to help strengthen the fit, as seen in FIG. 7. In the locking case 3 are provided projecting ribs 31 having a semi-circular shaped channel 311 incorporated therein. The innermost end of the channel is enclosed as shown in FIG. 5, but said channel is complete with bypass ports 312 on one side and will appear exposed on the rib 41 from the semi-circular channel. Once mounted in the lock panel 4, such a bypass port would then account for a blind hole 9, as appears apparent in FIG. 3, accommodating the setting of detent 32 and the compression spring 322 seated in blind hole 324 relative to detent 32. The other end of spring 322 bearing against the wall aligned to blind hole 9, enclosed by projecting ribs 31, 41 juts forth from lock case 3 and lock panel 4, as seen in FIG. 3. Bypass opening 312 permits penetration of L shaped detent 51, extended from slider 5, into annular groove 321 relative to the detent 32 without restraint, to ensure a throughput engagement of the lock stem 2 in an immovable condition.

Figure 6:
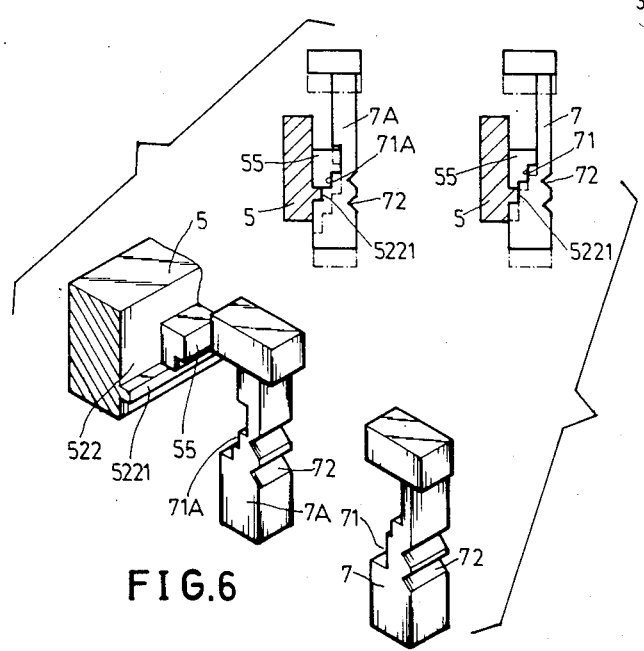
FIG. 6 illustrates the structural layout of the slider in relation to two kinds of coded plates structured hereunder.

On the base of the lock case 3 is provided a projecting pin 38 by extension, rivet-fixed by the intromission of a spring reed 73, also with two symmetrically aligned blind passageways 35, as shown in FIG. 5, to permit side-by-side introduction of differently shaped card boards 7, 7A, as shown in FIG. 6, the farther ends of card boards 7, 7A abutting against holes 42 reserved in the lock panel 4. On the back of the card boards 7, 7A are provided two keyways 72, one of them thrust upon by spring reed 73 and shifted in its setting to another keyway by depression or uplifting of card boards 7, 7A resulting from upward displacement of prop 752 welded to L shaped control lever 75, and shifted for resetting purposes when the control lever 75 is displaced horizontally. The displacement will terminate on the projecting ribs 5221 on the slider 5 being acted upon by the terminal end of the card boards 7, 7A as shown in FIG. 6. The reset lever 75 is inserted for connection to the hole 362 on protrusion 36 and with hole 753 thereof via elastic cotter pin 745 on passing beyond surface 361 provided on protrusion 36 that is extended from lock case 3, prop 752 being provided by welding to the levelwise forefront of lever 75. On the prop 752, edge 7521 is at a position lower than edge 7522 in relation to the level paralleling said lever in order that the reset lever 75 may perform an arcuated displacement when acted upon so that both columns of the card boards 7, 7A can be brought to shift altogether upwards to the dead point. The standing portion of the lever 75 is partially inserted in the slot 521 located at the bottom of the rectangular projection 54 of the slider 5, as is shown in FIG. 2. The underside of surface 521 relative to slider 5 is processed into a wider groove 523 to prevent intervention of longitudinal displacements of slider 5 by protrusion 36. The vertical tipfront of the reset lever 75 projects outside the sides of opening 43 relative to the locking panel 4, with projections 751 provided on both sides to bear upon the interior of lock panel 4 such that it can allow for back-drawn pulling efforts only.

Depression of the card boards 7, 7A in conformity to code number will set their correspondingly provided dents 72, 71A aligned to each other, to the effect that the slider 5 can be pushed in via an opening 61 in front of the lock casing 3 unrestrainedly. Sealing can be done by the seal 6 or by fitting with respect to a hole reserved on the lock case by an extension of a tightening means therefor. The rectangular projection 54 in front of the slider 5 is engaged into opening 61 relative to the seal 6, having a blind hole provided in two flanges 53 by incorporation in the tail thereof, admit accommodation of a compression spring 531 in each flange 53 serving as a moment in reserve to drive slider 5 forward. Lock case 3 and lock panel 4 form a duct 100 with standing wall of lock case 3 through two ribs 33, 48, as better seen in FIG. 3 through FIG. 4, to restrict displacement of slider 5 in longitudinal direction only. One side of the slider 5 is processed into an extended L shaped detent 51 serving to depress annular groove 321 provided on detent 32 along with a displacement of slider 5 so as to restrict subsequent displacements thereof, thereby achieving locking and unlocking of lock stem 2 in association with lock framework 10.

By depressing slider 5 inward to cause projection 53 to come into contact with the wall of lock case 3, projection 54 will then become almost flush with lock panel 4, as indicated in dotted lines in FIG. 3. The L shape detent engaging into annular groove 321 on the detent, amounts to a closure of the lock stems, whereupon the two opposing notches 522 on either side of the central channel 52 to the slider will point right to the card boards 7, 7A respectively. Projections 55 are engaged with gaps in the card boards 7, 7A, such an engagement to be removed once the reset lever 75 is acted upon to result in its prop 752 forcing card boards 7, 7A up. To follow that, the projections 55 are blocked by card boards 7, 7A, as better seen in FIG. 6. When slider 5 fails to displace ahead any more, the detent 32, receiving the compression accordingly, does not recede any more. That means that the lock stem 2 would then fail to be driven to a released status. The notches 71, 71A, when aligned to the pushkey card boards 7, 7A respectively, will clear obstacles to the projected area of slider 5, such that the projections 55 will run forwards, owing to stresses inflicted by compression springs 531, to the shoulder 541, and bear upon the interior of the seal 6. That is, when it gets rid of the detent 32, then the lock stem 2 will permit withdrawing efforts directed to unlock the lock 10.

Figure 4:
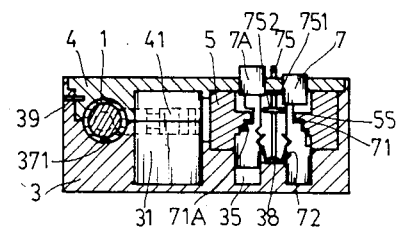
FIG. 4 is a sectioned view of that portion of the lock embodied according to and taken along segment 4—4 as seen in FIG. 1.

To put the invention lock to active service, the first step is to give depressions in the code number to the card board pushkey 7, 7A to set the correspondingly shaped step-like check elements or dents 71, 71A under the push keys, as shown in FIG. 4, thereby bringing slider 5 to move ahead under the discharge of compression springs 531. The projections 55 enjoy movements to and from dents 71, 71A relative to card boards 7, 7A without restriction. That means all of slider 5 will.enjoy a free movement as the extended L shaped detent 51 will no longer get caught in the annular groove 321 about the detent 32. The lock stem 2, being pushed into lock stem 1, will bring pressure to bear upon the arcuated portion 323 in front of detent 32. The detent 32 intervened by spring 322 becoming available for regression, and by the force inflicted by spring 322 will get engaged with annular groove 21 on the lock stem 2 once again. Whereupon the lock stem 2 can be brought to be engaged with lock stem 1 to a length set in advance, the elbow 15, 25 on either stem hooked to the steering wheel and to the accelerator respectively.

Slider 5 is depressed such that its end projection 53 comes into contact with the armor wall of the lock case 3. Bypass ports on either side of the central channel 52 in the slider 5 are brought to end positions on the card boards 7, 7A respectively. The projections 55 interact in the meantime, followed by activation of the reset lever 75 to set dents 71, 71A out of alignment relative to the card boards 7, 7A. The projection of detent 51 on the slider 5 is blocked. The slider 5 fails to move ahead any further, and with its extended detent 51 intervening in the annular groove 321 relative to the detent 32, to the effect that the detent 32 itself, compressed likewise, is restricted from further retreats, and with its front tip engaged in the annular groove 21 relative to the lock stem 2, which brings the lock set to a closed condition.

To set the lock 10 to open, the card boards 7, 7A are then both brought up to the tail end of notches 71, 71A, by the transmission of prop 752 relative to reset lever 75, thereby reaching the uppermost dead point checked by the flanged rib 5221 serve as to prevent unrestricted uplifting of card boards 7, 7A that would then result in loss of the antitheft functions of a lock. The card boards 7, 7A check movements of slider 5 to bring lock stem 2 to a closed status, so that the card board has to be depressed upon to set dents 71, 71A in alignment, such that slider 5 can move ahead to bring detent 51 out of the annular groove 321 relative to detent 32. The detent 32 is compressed to retreat to the effect that lock stem 2 is pulled to bring the lock 10 to an unlocked state. Next, effects discharged by V shaped projections on spring 73 to the slits 72 on the back of card boards 7, 7A will help stabilize the card boards 7, 7A so that they would remain in position in spite of shock effects.

The operation of the lock is based on the cooperation between the checking elements of the keys 7, 7A and the projections 55. The two types of checking elements of the keys can be used to form a plurality of combinations, and each lock is made with a different choice of the arrangement of the checking elements. If the code of the lock is known, a number of predetermined keys have to be depressed so that the slider 5 can be pushed into the case by pressing said projection 54, because the step-like notches of those checking elements are in agreement with those cuts on projection 55, permitting the members 55 on the slider 5 to move through those fixed keys. Then the pushed-in slider 5 has the front end of its L shaped detent 51 engaged with the annular groove 321 of the detent 32, and the bullet-like detent 32 can be stopped from being moved back when the reset lever 75 is pushed upward with the prop 752 pushing 10 keys to assume their original un-depressed state so as to keep those checking elements of the keys in disagreement with projections 55 so as to stop the slider 5 from moving back, and the detent 32 in engagement with one of the arcuated notches is restrained at its position as is the locking stem 2, to effect a locking purpose.

When unlocking the lock, the coded keys are depressed, making all the checking elements under the 10 keys at the same time, in agreement with those projections 55, so that the slider 5 can be pushed back by the depressed springs 531. As a result, the L-shaped detent 51 disengages from the annular groove 321, permitting the bullet-like detent 32 to move back when locking stem 2 is pulled.

The lock is mainly comprised of a slider 5 and a bullet-like detent 32 which is housed in a cylindrical case 311 and can be pushed to stick out by a spring 322 to engage with one of the arcuated notches of the locking stem 2, and the 10 keys arranged in two columns indicate as 7 and 7A in pairs. The keys are attached with two different types of checking elements thereunder wherein each has predetermined step-like notches 71 or 71A respectively.

The pushkey as extensions of the card boards 7, 7A on the panel of the lock 10 are inscribed with the alphabet or Arabic numbers by printing or otherwise treated such that each lock 10 can have a code incorporated by combination of such alphanumerical ciphers. The provision of ten different pushkeys make possible the make-up of a code that cannot possibly be imitated by anybody not knowing the identification code number in spite of almost infinite trial and error tests, and the lock of the invention as such eliminates all the worries inevitable with the use of a conventional lock that can be unlocked by the use of a mechanical key since a mechanical key can be reproduced and simulated by a thief skilled in the art while attempting to open a conventionally structured lock.

The disclosure going thus far should leave little doubt as to the novelty, advance, and practical features of the present invention.

I claim:

1. A push-button type steering wheel lock comprising
    a lock case;
    a lock panel covering one side of said lock case and having a plurality of openings therethrough;
    a pair of J shaped lock stems, with one each extending from opposite ends of said lock case;
    a slider having a portion extending through a seal from said lock case;
    a plurality of card boards extending as pushkeys through said openings in said lock panel with identification ciphers on said pushkeys from which a code number can be produced by the permutation and combination of said ciphers;
    said pushkeys having individually shaped dents;
    a keyway provided centrally in said slider with a plurality of projections, with notches between said projections, on both sides of said keyway;
    said projections having one side extended as an L shaped detent symmetrically placed and interacting with said trapezoidal notches and aligned for free movement upon depression of said card boards in a predetermined code;
    one of said lock stems having a tubular construction and the other of said lock stems of solid construction with notches therein;
    a detent, spring biased to enter said notches in said lock stem through an opening in said tubular lock stem and allowing outstretching of said lock stems when compressing a spring of said spring biased detent whereupon the lock is brought to an opening condition;
    said slider in a depressed condition against a spring bias, setting dents on both sides of said central keyway to a position with said card boards extending in said notches;
    a reset lever having a prop connected to act with said card boards with said reset lever bringing said prop upwards until the prop causes said card boards to bear upon the projections on said slider preventing movement of said slider concurrent with an extended L shaped detent extending outwardly from said slider engaged in an annular groove of said spring biased detent extended into an annular notch on said J shaped lock stem of solid construction.

2. The push-button type steering wheel lock according to claim 1 comprising
    flanged ribs on said slider under said notches on both sides of said keyway of said slider where against which said card board is brought to lift upwards until reaching an uppermost limiting point.

3. The push-button type steering wheel lock according to claim 1 comprising
    a front tip of said prop being lower than a horizontal level position of said reset lever.

4. The push-button type steering wheel lock according to claim 1 comprising
    two slits on the back of the card boards beared upon by two stand-off V shaped projections incorporated in a spring piece roughly in the shape of the letter U precluding sliding of said card boards off-course.

* * * * *